US009749965B2

United States Patent
Manssour (10) Patent No.: US 9,749,965 B2
(45) Date of Patent: Aug. 29, 2017

(54) METHOD FOR UPLINK FRACTIONAL TRANSMIT POWER CONTROL

(75) Inventor: Jawad Manssour, Stockholm (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 330 days.

(21) Appl. No.: 13/882,665

(22) PCT Filed: Nov. 2, 2010

(86) PCT No.: PCT/SE2010/051191
§ 371 (c)(1),
(2), (4) Date: Apr. 30, 2013

(87) PCT Pub. No.: WO2012/060746
PCT Pub. Date: May 10, 2012

(65) Prior Publication Data
US 2013/0225226 A1 Aug. 29, 2013

(51) Int. Cl.
*H04W 52/24* (2009.01)
*H04W 52/14* (2009.01)
*H04W 52/36* (2009.01)

(52) U.S. Cl.
CPC ....... *H04W 52/242* (2013.01); *H04W 52/244* (2013.01); *H04W 52/146* (2013.01);
(Continued)

(58) Field of Classification Search
CPC ............. H04W 52/242; H04W 52/244; H04W 52/146; H04W 52/362; H04W 52/246; H04W 52/248; H04W 52/24
See application file for complete search history.

(56) References Cited

U.S. PATENT DOCUMENTS 6,498,934 B1 * 12/2002 Muller ............... H04W 16/10
455/446
2008/0166976 A1 7/2008 Rao
(Continued)

FOREIGN PATENT DOCUMENTS

| KR | 20080065212 A | 7/2008 |
|---|---|---|
| WO | 2009135848 A2 | 11/2009 |
| WO | WO 2010035966 A2 * | 4/2010 |

OTHER PUBLICATIONS

Muhammad, B. et al, "Uplink Closed Loop Power Control for LTE System." 2010 6th International Conference on Emerging Technologies (ICET), Oct. 18-19, 2010, pp. 88-93.

*Primary Examiner* — Wesley Kim
*Assistant Examiner* — Dong-Chang Shiue
(74) *Attorney, Agent, or Firm* — Patents on Demand P.A.; Brian K. Buchheit; Scott M. Garrett (57) ABSTRACT

Embodiments herein relate to a user equipment (10), a radio base station (12) and methods therein for handling transmission power control of the user equipment (10). The user equipment (10) is served by the radio base station (12) in a serving cell (i) controlled by the radio base station (12). The radio base station (12) or user equipment obtains a first pathloss from the user equipment (10) towards the serving cell (i) and a second pathloss from the user equipment (10) towards an interfered cell (j). The radio base station (12) or the user equipment (10) then selects a value of one or more parameters, respectively, which one or more parameters are to be used to control a transmission power of the user equipment (10) and which value is selected based on the first pathloss and the second pathloss.

16 Claims, 8 Drawing Sheets (52) U.S. Cl.
CPC ........ *H04W 52/246* (2013.01); *H04W 52/248* (2013.01); *H04W 52/362* (2013.01)

(56) References Cited

U.S. PATENT DOCUMENTS

| | | | |
|---|---|---|---|
| 2010/0048237 A1* | 2/2010 | Kishiyama et al. ........... | 455/522 |
| 2010/0062799 A1* | 3/2010 | Ishii .................... | H04W 52/146 455/522 |
| 2011/0070919 A1* | 3/2011 | Komine et al. ............... | 455/522 |
| 2012/0052904 A1* | 3/2012 | Gao et al. ..................... | 455/522 |
| 2012/0099444 A1* | 4/2012 | Hakola et al. ................ | 370/248 |

* cited by examiner

METHOD FOR UPLINK FRACTIONAL TRANSMIT POWER CONTROL

TECHNICAL FIELD

Embodiments herein disclose a user equipment, a radio base station and methods therein. In particular, embodiments herein relate to handle transmission power control of the user equipment.

BACKGROUND

Modern radio communications networks have strict requirements in terms of capacity, coverage and achievable bit rates. These requirements have to be met while ensuring that the battery lifetime of a user equipment served in the radio communications network is not quickly drained. One of the most relevant features that may affect a performance of capacity, coverage and achievable bit rates is power control. In radio communications networks the user equipments are communicating via a radio base station by transmitting data to the radio base station in an uplink (UL) transmission. The data is transmitted by the user equipment using a transmission power. Specifically, in case of the uplink where the battery life is more of a significant problem, power control of the transmission power plays an important role in balancing between a transmission power to obtain a desired signal to noise ratio of a signal at the radio base station, and an interference at a neighbouring radio base station in the radio communications network which the transmission power would simultaneously cause.

A power control scheme usually comprises a combination of an open loop component and a closed loop component. The open loop component is responsible of setting a rough operating point of transmission power whereas the closed loop component is responsible for fine tuning of the transmission power.

In Orthogonal Frequency Division Multiplexing (OFDM) based networks such as Long Term Evolution (LTE) and Worldwide Interoperability for Microwave Access (Wi-MAX) networks, the transmissions within one cell are in general orthogonal along the frequency dimension. This means that the most dominant form of interference is inter-cell interference to or from neighbouring cells.

As mentioned above, the power control comprises two components: the closed loop component and the open loop component. The open loop component comprises mainly of two parameters, $P_0$ and $\alpha$. $P_0$ is a base level component that represents a target power at the radio base station. The parameter $\alpha$, known as the fractional pathloss compensation component, is used to control how much of the pathloss to its own cell a user equipment should compensate for by adjusting, i.e. increasing or decreasing, its own transmission power.

In short, the combination of $P_0$ and $\alpha$ would allow the radio base station to configure a degree to which the user equipment responds to the pathloss where $\alpha$ is used parameter to trade off between the fairness of UL scheduling and an average cell throughput. Allowing full pathloss compensation, i.e. $\alpha=1$ as $\alpha \leq 1$, would allow transmissions from a user equipment located at a cell edge to be received with a higher power at the radio base station. However, when looking at a multi-cell system, a full pathloss compensation would lead to a significant increase in the inter-cell interference which would subsequently lead to a decrease in the average cell throughput and inherently decrease the performance of user equipments at the cell edge as these are the most vulnerable to inter-cell interference.

The general method of choosing $\alpha$ and $P_0$ is based on system level simulations where a trade off between cell edge performance and average cell performance is obtained, which would result in a suitable value of $\alpha$ and/or $P_0$ to be used for all user equipments in a cell. The agreed values to be used for fractional pathloss compensation component $\alpha$ are today 0, 0.4, 0.5, 0.6, 0.7, 0.8, 0.9 and 1, wherein 0 indicates no compensation for the pathloss and 1 indicates full compensation for the pathloss.

Current solutions try to find the optimal $\alpha$ and/or $P_0$, similar $\alpha$ and $P_0$ to all user equipments within a cell, or in the whole system, that are good compromises between cell throughput and cell coverage. However, these solutions have not resulted in optimal performance of the network.

SUMMARY

An object of embodiments herein is to enable a power control that provides a high performance of a radio communications network.

According to an aspect of embodiments herein the object is achieved by providing a method in a radio base station for handling transmission power control of a user equipment. The user equipment is served by the radio base station in a serving cell controlled by the radio base station. The radio base station obtains a first pathloss from the user equipment towards the serving cell and a second pathloss from the user equipment 10 towards an interfered cell. The radio base station then selects a value of one or more parameters, respectively, based on the first pathloss and the second pathloss. The one or more parameters are to be used to control a transmission power of the user equipment, such as $\alpha$ and/or $P_0$.

In order to perform the method a radio base station for handling transmission power control of the user equipment is provided. As stated above the user equipment is served by the radio base station in a serving cell controlled by the radio base station. The radio base station comprises an obtaining circuit configured to obtain a first pathloss from the user equipment towards the serving cell and to obtain a second pathloss from the user equipment towards an interfered cell. The radio base station further comprises a selecting circuit configured to select a value of one or more parameters, respectively, based on the first pathloss and the second pathloss. The one or more parameters are to be used to control a transmission power of the user equipment, such as $\alpha$ and/or $P_0$.

According to another aspect of embodiments herein the object is achieved by providing a method in the user equipment for enabling power control of the user equipment performed by the radio base station. The user equipment obtains a first pathloss from the user equipment towards the serving cell and a second pathloss from the user equipment towards an interfered cell. The user equipment then selects a value of one or more parameters, respectively, based on the first pathloss and the second pathloss. The one or more parameters are to be used to control transmission power of the user equipment. The user equipment also transmits the value to the radio base station enabling the radio base station to perform the power control of the user equipment.

In order to perform the method a user equipment for enabling power control of the user equipment performed by the radio base station is provided. The user equipment is configured to be served by the radio base station in a serving cell controlled by the radio base station. The user equipment comprises an obtaining circuit configured to obtain a first pathloss from the user equipment towards the serving cell, and to obtain a second pathloss from the user equipment towards an interfered cell. The user equipment further comprises a selecting circuit configured to select a value of one or more parameters, respectively, based on the first pathloss and the second pathloss. The one or more parameters are to be used to control a transmission power of the user equipment. The user equipment also comprises a transmitter configured to transmit the value to the radio base station. Thereby, the radio base station is enabled to perform the power control of the user equipment.

By selecting the value of the one or more parameters, such as $\alpha$ and/or $P_0$, based on the pathloss towards an interfered e.g. neighbouring, cell and the pathloss to the serving cell, a significantly better performance for both user equipments, such as user equipments with special cases of pathlosses, and improved average cell data throughput is allowed.

Embodiments herein enable a high performance of the radio communications network in terms of coverage and capacity. This is done through examining the values of pathloss to a user equipment's serving cell and to a user equipment's interfered cell or cells. These two pathlosses may in some embodiments be used to identify a user equipment with non-typical pathlosses and consequently adjust $\alpha$ and/or $P_0$ utilized by the identified user equipment based on the obtained pathlosses.

BRIEF DESCRIPTION OF THE DRAWINGS

Embodiments will now be described in more detail in relation to the enclosed drawings, in which.

DETAILED DESCRIPTION

Figure 1:
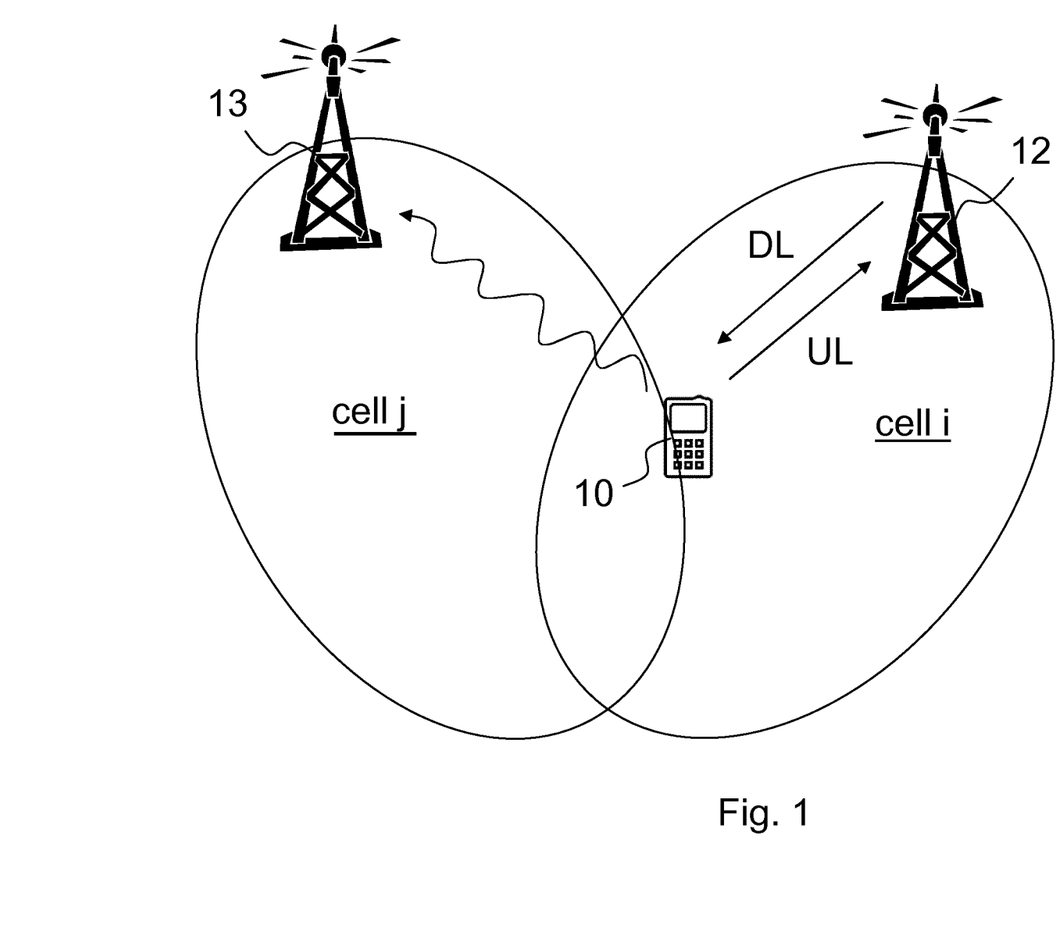
FIG. 1 is a schematic overview depicting a radio communications network.

FIG. 1 shows a schematic overview of a radio communications network, such as any OFDM based radio communications network. In the radio communications network a user equipment 10 is communicating with a radio base station 12, also referred to as a serving radio base station 12, by transmitting data to the radio base station 12 in an uplink (UL) transmission. Also, data is transmitted to the user equipment 10 from the radio base station 12 in a downlink (DL) communication. The data is transmitted from the user equipment 10 using a transmission power. The user equipment 10 is served by the radio base station 12 in a first cell i, also referred to as a serving cell i. The radio communications network comprises a neighbouring radio base station 13 serving a second cell j, also referred to as an interfered cell j, which second cell j may be neighbouring the first cell i. It should be understood that the second cell j may be served by the same radio base station as the first cell i, i.e. the serving radio base station 12. An open loop power control scheme may be implemented into the radio base station 12 to control transmission power of the user equipment 10. As stated above, the open loop component comprises two parameters, $P_0$ and $\alpha$. $P_0$ is a base level component that represents a reception power, also referred to as a target power value, at the radio base station 12 whereas $\alpha$, known as the Fractional Pathloss Compensation (FPC) component or as a weighting indicator of the pathloss, is used to control how much of the pathloss to its own cell a user equipment should compensate for by adjusting, i.e. increasing or decreasing, its own transmission power.

Although using FPC, i.e. $\alpha<1$, thus compensating only for a fraction of the pathloss, has shown gains as opposed to full pathloss compensation, i.e. $\alpha=1$, the selection may be optimized to provide better performance for both cell edge user equipments and an average cell throughput. However, in case there are many indoor user equipments or more generally, user equipments with non-typical values of pathloss, using a certain FPC throughout the cell i would provide significantly worse performance compared to full compensation because the FPC would lead to a lower received power at the eNB, without really decreasing the interference. The main reason for that is that $\alpha$ and $P_0$ are based on simulations and especially where a certain ratio between the $\alpha$ and/or $P_0$ of indoor/outdoor user equipments is assumed. When this ratio is not accurate, the performance will significantly be reduced. According to embodiments herein the value of $\alpha$ and/or $P_0$ for the user equipment 10 are selected based on a pathloss towards the serving cell i and a pathloss towards the interfered cell j.

By selecting values of one or more parameters, such as $\alpha$ and/or $P_0$, based on a pathloss towards the serving cell i and a pathloss towards the interfered cell j, embodiments herein create an additional parameter to take into account when it comes to performing power control and allow a significantly better performance for user equipments within the cell i and average cell throughput.

Figure 2:
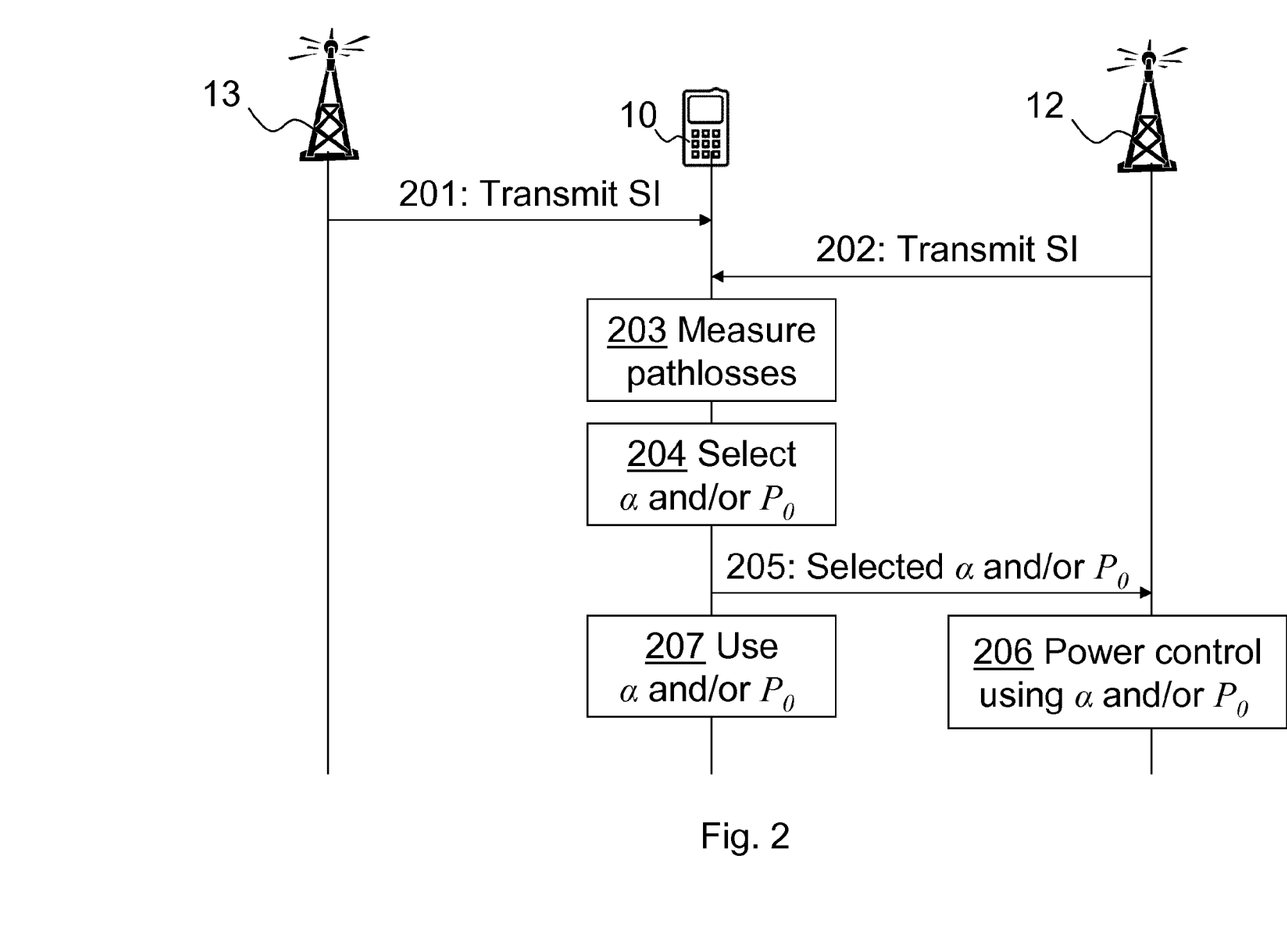
FIG. 2 is a schematic combined signalling and flow chart in a radio communications network.

FIG. 2 is a schematic combined signalling and flow chart in a radio communications network. Some embodiments herein aim at allowing each user equipment 10 to select its own $\alpha$ and/or $P_0$, based on measurements present at the user equipment 10. Alternatively the radio base station 12 may select $\alpha$ and/or $P_0$ based on the pathloss measurements as described in FIG. 3 below.

Thus, $\alpha$ and/or $P_0$ may be adjusted for the user equipment 10, for example, having a non-typical pathloss ratio between serving cell i and interfered cell j. The steps herein may be performed in any suitable order. A non-typical pathloss will be more described below.

Step 201.

The neighbouring radio base station 13 transmits or broadcasts system information (SI) over a broadcast channel over the interfered cell j.

Step 202.

The serving radio base station 12 transmits or broadcasts system information (SI) over a broadcast channel of the serving radio base station 12, over the serving cell i. It should be noted that the serving cell i and the interfered cell j may be controlled by the same radio base station.

Step 203.

The user equipment 10 measures the pathloss to several cells, one of these cells would be the user equipment's serving cell i, whereas the others would be interfered cells, such as interfered cell j. For example, the user equipment 10 may derive a target Signal to Interference and Noise Ratio (SINR) at the radio base stations 12,13 and a received power in the transmissions from the radio base stations 12,13.

These target SINRs and received powers may then be used to determine pathlosses. Hence, the user equipment 10 measures pathloss to serving cell i $PL_{ii}$ and pathloss to interfered cell j $PL_{ij}$. $PL_{ii}$ is the pathloss between the user equipment 10 and the radio base station 12 in the serving cell i and $PL_{ij}$ is the pathloss between the user equipment 10 and the interfered cell j.

Step 204.

The user equipment 10 selects $\alpha$ and/or $P_0$, actually values of $\alpha$ and/or $P_0$, based on the pathloss to serving cell i $PL_{ii}$ and pathloss to interfered cell j $PL_{ij}$. According to embodiments herein these pathloss measurements are used when selecting $\alpha$ and/or $P_0$, e.g. $\alpha=f(PL_{ii}, PL_{ij})$ and $P_0=g(PL_{ii}, PL_{ij})$. The selection of $\alpha$ and/or $P_0$ will be more explained below. Thus, embodiments herein provide one or more values of parameters, e.g. $\alpha$ and/or $P_0$, that are to be used to control a transmission power of the user equipment 10 and that are set depending on a radio position of the user equipment 10. The radio position may be defined as a relation between radio conditions in the serving cell i and in at least one interfered cell j.

In one example, the value of $\alpha$ and/or $P_0$ may be selected based on a ratio of $PL_{ii}/\min(PL_{ij})$ as the performance is typically dominated by the worst interfered cell so there may be no need to take into account the sum of interference to all cells, thus reducing the complexity. However, in some embodiments the sum of interferences to all interfered cells is taken into account when selecting $\alpha$ and/or $P_0$ in order to take into account the user equipment 10 when it interferes with a large number of cells. So for the aforementioned ratio $PL_{ii}/\min(PL_{ij})$ or similar ratio falling in a certain region, a predetermined value of $\alpha$ and/or $P_0$ may be used. These regions may be divided into different kinds of user equipments, e.g. a region of common or average interfering user equipment, a region of non-interfering user equipments and a region of very interfering user equipments. The value of the $\alpha$ and/or $P_0$ may be set based on the determined region of the user equipment 10, e.g. $\alpha=1$ for high pathlosses towards both cells i,j; $\alpha=0$ or $\alpha=0.4$ when the user equipment 10 has a low pathloss towards both cells i, j; $\alpha=0.8$ when the user equipment 10 has a high pathloss towards interfered cell j or the like. It should be noticed that it may be a combination of $\alpha$ and $P_0$, that would result in a high or low transmit power.

By letting $\alpha$ and/or $P_0$ not only be affected/influenced by the $PL_{ii}$ but also $PL_{ij}$, e.g. by choosing $\alpha$ and/or $P_0$ as a function of $PL_{ii}$ and $PL_{ij}$, the embodiments herein create a new degree of flexibility when it comes to performing power control and allows for a significantly better performance for both user equipments within the serving cell i and average cell throughput.

In some embodiments, a general $\alpha$ and/or $P_0$ may be used for most of the user equipment 10 within the serving cell i for the most cases. The selected $\alpha$ and/or $P_0$ based on the first and second pathlosses is only used for the user equipment 10 when it has a pathloss or pathlosses over a certain threshold value or a ratio between the pathlosses that goes beyond a ratio threshold value. In these embodiments the user equipment 10 is identified when these pathloss measurements or a combination of them, e.g. subtraction in the logarithmic domain, fall outside a certain threshold region a.k.a. non-typical pathloss. Thus, the value of the $\alpha$ and/or $P_0$ may be selected based on a ratio or a difference between the pathloss to the serving cell and the pathloss to at least one interfered cell. The ratio is used to identify non-typical user equipments when the ratio differs from a normal ratio range. A non-typical user equipment is defined as a user equipment with a non-typical pathloss as described below.

Step 205.

The user equipment 10 transmits the selected $\alpha$ and/or $P_0$ to the radio base station 12.

Step 206.

The radio base station 12 receives and may use the selected $\alpha$ and/or $P_0$ for performing transmission power control of the user equipment 10.

Step 207.

The user equipment 10 may also use the $\alpha$ and/or $P_0$ in a transmission power control scheme.

To conclude, prior art solutions utilize a common $\alpha$ and/or $P_0$ value or values for all user equipments in a cell or in the radio communications network, where this $\alpha$ and/or $P_0$ value is obtained e.g. by means of simulation. The selected $\alpha$ and/or $P_0$ values represent a certain compromise between coverage and capacity. Although such a method is good on average when the cell characteristics i.e. ratio of indoor/outdoor user equipments, match those used in the simulations to obtain the $\alpha$ and/or $P_0$ values, the capacity and coverage may be significantly increased by individually treating the user equipment 10. Embodiments herein adjusts a value of one or more parameters, $\alpha$ and/or $P_0$, to be used to control transmission power of the user equipment 10 in order to enhance the performance of the user equipment 10. This provides a dynamical function, created by setting the values of $\alpha$ and/or $P_0$ as a function of both $PL_{ii}$ and $PL_{ij}$. Embodiments herein also provide a way of identifying the user equipment 10 as a "non-typically" behaving user equipment and then adjust the user equipment's 10 one or more parameters in order to enhance the performance in the radio communications network.

Embodiments herein allow, through controlling the $\alpha$ and/or $P_0$ based on $PL_{ii}$ and $PL_{ij}$, also a control of generated inter-cell interference. By adjusting the amount of transmission power the user equipment 10 and each other user equipment within the cell i is allowed to use, wherein the transmission power is based on the pathlosses to the user equipment's serving cell and interfered cell or cells, a better performance for cell-edge user equipments, indoor user equipments, user equipments with significant shadow fading, user equipments in micro cell heavily interfered by a nearby macro user equipment, etc. may be obtained.

Even when the user equipment 10 is in good radio conditions it would benefit from embodiments herein as the user equipment 10 may utilize a high value of $\alpha$ and/or $P_0$, since the user equipment 10 would typically not generate high interference, instead of being constrained by a lower $\alpha$ and/or $P_0$ used for all user equipments within the cell i or the radio communications network.

Embodiments herein allow the user equipment 10 to adjust $\alpha$ and/or $P_0$ based on its own power or pathloss measurements with the possibility for the radio base station 12 to override these decisions. Furthermore, the user equipment 10 may also use some predetermined thresholds to identify whether to use a selected $\alpha$ and/or $P_0$ or a predetermined $\alpha$ and/or $P_0$.

Before describing further embodiments herein the following mathematical discussion is performed to gain more insight how optimization of selection of $\alpha$ and/or $P_0$ may be performed. First, a capacity equation is derived based on a Shannon's model in case of a multi-cell Orthogonal Frequency Division Multiplexed (OFDM)-based radio communications network looking at one resource block during one symbol interval.

A transmission power $Tx_i$ used during a transmission by the user equipment 10 in serving cell i is given by:

$$Tx_i = P_{0,i} * (PL_{ii})^{\alpha_i} \quad \text{(Eq. 1)}$$

where
$P_{0,i}$ is the target power value at the radio base station 12 in the serving cell i,
$PL_{ii}$ is the pathloss between the user equipment 10 and the radio base station 12 in the serving cell i, and
$\alpha_i$ is the fractional pathloss compensation factor in serving cell i.

A received power $Rx_{ii}$ received at the radio base station 12 in the serving cell i from the transmission of the user equipment 10 in the serving cell i is given by:

$$Rx_{ii} = \frac{Tx_i}{PL_{ii}} \quad \text{(Eq 2)}$$
$$= P_{0,i} * (PL_{ii})^{(\alpha_i - 1)}$$

In a multi-cell radio communications network, the radio base station 12 in the serving cell i will also receive interference from other user equipments transmitting in the neighbouring cell j on the same frequency band at the same time. This interference $I_i$ in the serving cell i is given by:

$$I_i = \sum_{\substack{j=1,\\j\neq i}}^{k} Rx_{ji} \quad \text{(Eq 3)}$$
$$= \sum_{\substack{j=1,\\j\neq i}}^{k} \left( P_{0,j} * \frac{(PL_{jj})^{\alpha_j}}{PL_{ji}} \right)$$

where
$Rx_{ji}$ is the interference power received at the interfered cell j from the transmissions by the radio base station 12 in the serving cell i,
$P_{0,j}$ is a target power at the neighbouring radio base station 13 in the interfered cell j and
$PL_{ji}$ is the pathloss from a use equipment in interfered cell j to the radio base station 12 in the serving cell i.

A capacity $C_i$ per Hz in serving cell i is given by:

$$C_i = \log_2(1 + SINR_i) \quad \text{(Eq 4)}$$
$$= \log_2\left(1 + \frac{Rx_{ii}}{I_i + N}\right)$$

$SINR_i$ is signal to interference and noise ratio in the serving cell i, and
N is the noise term.

Before analysing the derived equation, the system is assumed to be interference limited, so the noise term N can be ignored.

The above simplification is done in order to focus on the main limitation of embodiments herein. In other words, even without making the above assumption, prior art would still have its limitations and embodiments herein would still overcome these limitations.

A simplified capacity equation of the capacity $C_i$ may then be given by:

$$C_i = \log_2\left(1 + \frac{P_0 * (PL_{ii})^{(\alpha-1)}}{P_0 \sum_{\substack{j=1,\\j\neq i}}^{k} \left(\frac{(PL_{jj})^{\alpha}}{PL_{ji}}\right)}\right) \quad \text{(Eq 5)}$$

From the simplified capacity equation, it can be seen that the choice of $\alpha$ and $P_0$ is a trade-off between the desired signal, i.e. the numerator in the capacity equation would increase by increasing $\alpha$ and/or $P_0$, and the interference generated, i.e. the denominator of the capacity equation would increase by increasing $\alpha$ and/or $P_0$. So the higher the $\alpha$ and/or $P_0$, the higher the desired signal is but also the higher the interference is.

From the simplified capacity equation it is determined that $\alpha$ and $P_0$ affect the performance of the radio communications network. The $PL_{ji}$ term, i.e. the pathloss from the user equipment in the interfered cell j to the serving cell i, is not compensated for by $\alpha$ i.e. it is not weighted by $\alpha$ and/or $P_0$. Consequently, by simply having $\alpha$ and/or $P_0$ as a constant and trying to optimize over the parameters $\alpha$ and/or $P_0$, this would exclude accounting for the effect of the pathloss of a user equipment to other cells on the performance. However, $PL_{ji}$ plays a significant role in terms of determining an achievable capacity and generated interference in the radio communications network. To obtain $PL_{ji}$ it is needed to consider the interfered cell j. But, as the equation will be the same with the cell i and cell j exchanged, also $PL_{ij}$ plays a corresponding significant role. That is, what is a desired signal in one cell would be seen as an interfering signal in the neighbouring cell, and vice versa. From the equation Eq 5 one can see that $PL_{ji}$ and thus $PL_{ij}$ will never be weighted by $\alpha$.

The pathloss to neighbouring radio base stations affects all user equipments in the radio communications network including the user equipment 10. However, it may severely limit the performance of user equipments with 'non-typical' pathloss to their serving cell and interfered cells. What is meant by 'non-typical' pathloss is described with specific examples in the following cases.

Case 1: Indoor User Equipments

The user equipment 10 being an indoor user equipment is defined as when the user equipment 10 suffers from indoor-to-outdoor penetration loss due to being inside a building. Even when being close to the radio base station 12, the user equipment 10 would typically have a high pathloss to the radio base station 12 in the serving cell i. However, the user equipment 10 would have an even higher pathloss to the neighbouring radio base station 13, unless they are located on the cell edge. This means that regardless of the high pathloss to radio base station 12 in the serving cell 12, the user equipment 10 would benefit from using a larger $\alpha$ and/or $P_0$ without generating interference to the other neighbouring radio base stations. With conventional fractional pathloss compensation FPC, i.e. using a certain $\alpha$ throughout the cell i, losses will be incurred as the desired signal will be received with a much lower power whereas the interference wouldn't decrease by much.

Case 2: Heterogeneous Network Scenario

Several implementations in a heterogeneous network scenario assume that the macro, micro, or relay cells are using the same frequency band, e.g. in-band relaying. In such scenarios, it would be very common to have the user equipment 10 that have a low pathloss to the radio base station 12 serving the user equipment 10 and a comparably low pathloss to a different radio base station serving an underlying or overlaying cell. The user equipment 10 would then generate significant interference and degrade the performance in terms of both capacity and coverage if using the common settings of α and/or $P_0$ throughout the cell i.

Case 3: Shadow-Faded User Equipments

Another practical case that would create a non-typical behaviour in pathloss is when the user equipment 10 is shaded due to e.g. large physical obstructions. If the obstruction is located between the user equipment 10 and the radio base station 12 serving the user equipment 10, the pathloss to serving radio base station 12 of the user equipment 10 could be significantly higher than expected. If the obstruction is located between the user equipment 10 and the neighbouring radio base station 13, the pathloss towards the interfered cell j would then be higher than expected. However, it could also be so that the user equipment 10 has a Line of Sight or good propagation condition with the neighbouring radio base station 13 leading to the user equipment 10 experiencing almost no shadowing, thus having a pathloss to the neighbouring radio base station 13 comparable to that to its serving radio base station 12.

Embodiments herein exploit the above scenarios to select α and/or $P_0$ in order to significantly improve the radio communications network performance in terms of coverage and capacity. This is done through examining the values of pathloss to the serving cell i and to the interfered cell or cells j. This may be implemented for the user equipment 10 and for every user equipment in the serving cell i. However, to get an efficient implementation these at least two pathlosses may be used to identify a 'non-typical' user equipment and consequently adjust the identified user equipment's utilized α and/or $P_0$ based on the obtained pathlosses.

In some embodiments, initial values of α and $P_0$ based on simulations may be used just to get started. These initial values are then adjusted based on the pathloss measurements to the serving cell i and interfered cell or cells j. For example, if these pathloss measurements or a combination of them, e.g. subtraction in the logarithmic domain, fall outside a certain threshold region a.k.a. non-typical pathloss, according to some embodiments, adjustments to α and/or $P_0$ for these specific user equipments are made. In some embodiments, a difference between the pathloss to the serving cell i and the pathloss to at least one interfered cell j or a ratio between the at least two pathlosses may be used to identify these non-typical user equipment.

By choosing values of α and/or $P_0$ based on $PL_{ii}$ and also $PL_{ij}$, embodiments herein create a dynamical function when it comes to performing power control and allow a significantly better performance for user equipments and average cell throughput.

Figure 3:
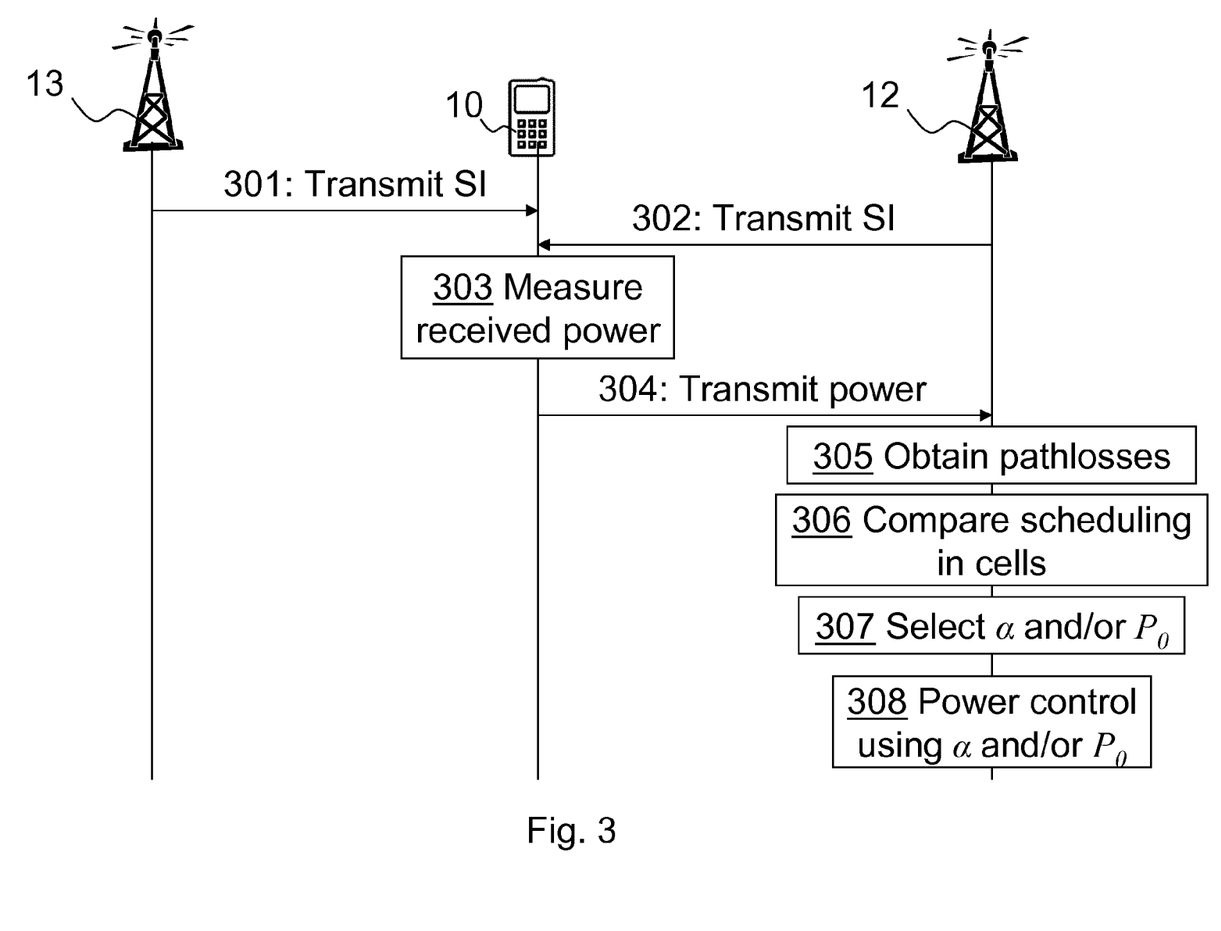
FIG. 3 is a schematic combined signalling and flow chart in a radio communications network.

FIG. 3 shows a combined signalling and flow chart in a radio communications network according to an alternative embodiment when the selection is performed by the radio base station 12. Embodiments herein may be implemented in a Long Term Evolutions network. The radio base station 12 is herein used to obtain pathlosses based on received power measurements from the user equipment 10. However, the radio base station 12 may also obtain the pathlosses by receiving the pathlosses from the user equipment 10. The steps may be performed in any suitable order.

Step 301.

The neighbouring radio base station 13 transmits or broadcasts system information (SI) over the broadcast channel over the interfered cell j. This step corresponds to step 201 in FIG. 2.

Step 302.

The serving radio base station 12 transmits or broadcasts system information (SI) over the broadcast channel of the serving radio base station 12, over the serving cell i. This step corresponds to step 202 in FIG. 2. It should be noted that the serving and interfered cells may be controlled by the same radio base station.

Step 303.

The user equipment 10 receives the broadcasted signals and measures received power. The user equipment 10 may determine pathlosses to the different cells based on the received powers. But in the illustrated example the user equipment 10 measure received powers which indicate the pathlosses to the serving cell i and the interfered cell j.

Step 304.

The user equipment 10 transmits the received powers of the different cells to the radio base station 12 indicating the pathlosses.

Step 305.

The radio base station 12 obtains the pathlosses of the different cells from the received powers from the user equipment 10. Thus, the radio base station 12 obtains the pathloss from the user equipment 10 to the serving cell i and the pathloss from the user equipment 10 to the interfered cell j.

Step 306.

The radio base station 12 may comprise information about traffic scheduling in the interfered cell j either from communicating with the neighbouring radio base station 13 or knowing as the interfered cell j is served by the same radio base station 12. The radio base station 12 then compares the scheduling in the serving cell i and the interfered cell j. Thus, if there is no transmission in a Physical Resource Block (PRB) that can interfere with one another this is taken into consideration when selecting a value of the α and/or $P_0$.

A Physical Resource Block (PRB) is defined as comprising 12 consecutive subcarriers for one slot, e.g. 0.5 ms. A PRB is the smallest element of resource allocation assigned by a scheduler of the radio base station 12.

Step 307.

The radio base station selects a value of α and/or $P_0$ based on the obtained pathlosses from the user equipment 10 towards the serving cell i and the one or more interfered cells, such as cell j. As stated above, the radio base station 12 may take the scheduling of a PRB of corresponding time slot and subcarrier in the interfered or neighbouring cell into consideration when selecting α and/or $P_0$. For example, if no interference may occur a higher value of α and/or $P_0$, may be selected. Similarly, if transmission occurs simultaneously in the both cells interference towards the interfered cell j should be taken into account and a small value of the α and/or $P_0$ may be selected.

The radio base station 12 may identify if the user equipment 10 falls outside a common group of user equipments by detecting when the user equipment 10 has pathloss relations such as a ratio between the pathlosses that differ from a normal pathloss relation, also referred to as a non-typical pathloss. For example, if the user equipment 10 has high pathloss towards the serving cell i but has an even significantly higher pathloss towards the interfered cell j, the user equipment 10 may use a high α and/or $P_0$ without causing too much interference in an interfered cell. When the user equipment 10 has a low pathloss to the serving cell i as well as the interfered cell j, the user equipment 10 may use a low value of the α and/or $P_0$ in order to avoid interference towards the interfered cell j. It should be noticed that it may be a combination of α and $P_0$, that would result in a high or low transmit power.

Step 308.

The radio base station 12 uses the selected α and/or $P_0$ to control the transmission power of the user equipment 10. For example, the α and/or $P_0$ is transmitted to the user equipment 10 in the radio communications network, using a user equipment-specific closed loop power control command, accumulated or absolute or using the user equipment-specific Radio Resource Control (RRC) configuration of received target power.

Figure 4:
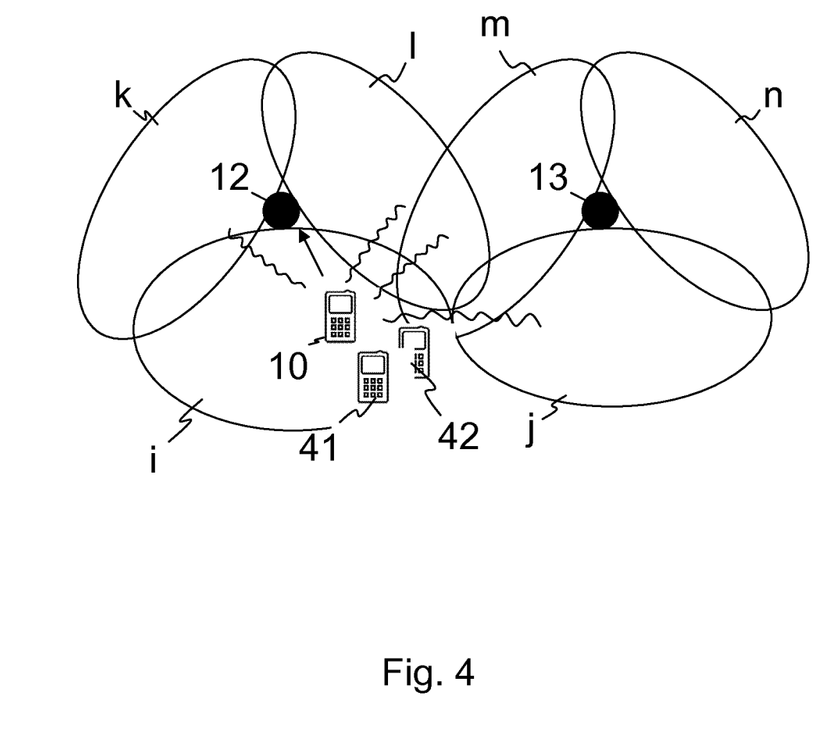
FIG. 4 is a schematic overview depicting a radio communications network.

FIG. 4 is a schematic overview of a radio communications network. The radio communications network comprises the serving radio base station 12 controlling the serving cell i, a third cell k and a fourth cell I. Furthermore, the radio communications network comprises the neighbouring radio base station 13 controlling the interfered cell j, a fifth cell m and a sixth cell n.

In the illustrated example, the radio base station 12 may obtain a number of pathlosses towards each interfered cell j,k,l,m resulting in a number of second pathlosses. Then, the value of the α and/or $P_0$ may be selected based on the first pathloss and a sum of the number of second pathlosses. Thereby, the radio base station 12 takes a total of interferences towards cells from the user equipment 10 into consideration when selecting α and/or $P_0$. Alternatively, the value of the α and/or $P_0$ may be selected based on the first pathloss and a lowest pathloss out of the number of second pathlosses. Thus, the radio base station 12 merely selects the α and/or $P_0$ based on the pathlosses towards the serving cell i and the most interfered cell out of the interfered cells j, k,l,m. It should also be understood that this way of selecting α and/or $P_0$ taken a plurality of interfered cells into consideration may be performed in the user equipment 10 when selecting α and/or $P_0$ in the user equipment 10.

In some further embodiments a number of user equipments, the first user equipment 10, a second user equipment 41 and a third user equipment 42 are served by the radio base station 12 in the serving cell i. The radio base station 12 obtains a first pathloss from each user equipment 10,41,42 towards the serving cell i, i.e. a pathloss to the serving cell i from the first user equipment 10, a pathloss to the serving cell i from the second user equipment 41, and a pathloss to the serving cell i from the third user equipment 42. Furthermore, the radio base station 12 obtains a number of second pathlosses from respective user equipment 10,41,42 towards the interfered cell j of the neighbouring radio base station 13 and selects the value of the α and/or $P_0$ based on an average of the first pathlosses and the second pathlosses of the number of user equipments 10,41,42. The radio base station 12 then uses the average value of the α and/or $P_0$ in a power control of the number of user equipments 10,41,42 as an initial value in a power control process.

In some embodiments, the radio base station 12 may further fine tune or adjust individually the transmission power of each user equipment 10,41,42 by transmitting a power command, such as a transmission power command (TPC). This TPC may be based on an updated selected value of the α and/or $P_0$ selected based on individual pathloss measurements for each user equipment 10,41,42. Thus, as TPC is an efficient control signalling procedure that indicates small steps of increments or decrements, an efficient power control signalling may be achieved.

Figure 5:
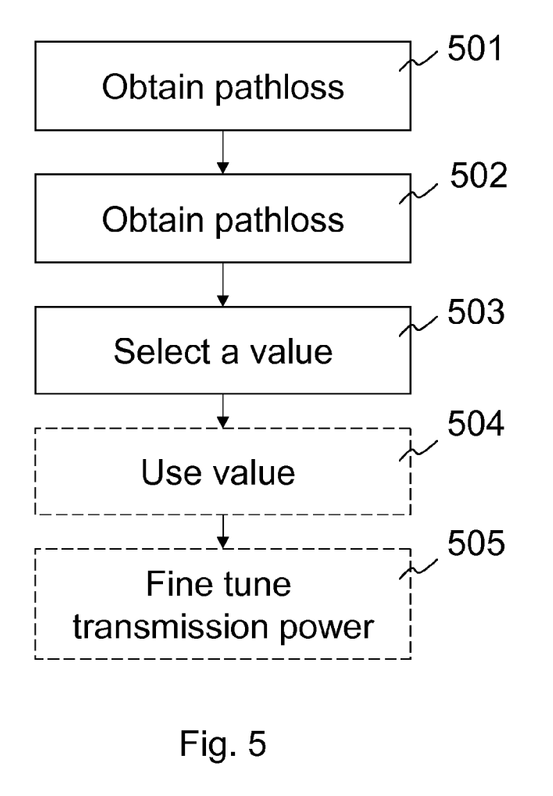
FIG. 5 is a schematic flow chart of a method in a radio base station.

The method steps in the radio base station 12 for handling transmission power control of the user equipment 10 according to some general embodiments will now be described with reference to a flowchart depicted in FIG. 5. The steps do not have to be taken in the order stated below, but may be taken in any suitable order. The user equipment 10 is served by the radio base station 12 in the serving cell i controlled by the radio base station 12.

Step 501.

The radio base station 12 obtains a first pathloss from the user equipment 10 towards the serving cell i.

Step 502.

The radio base station 12 further obtains a second pathloss from the user equipment 10 towards an interfered cell j. The interfered cell j may be a cell neighbouring the serving cell i, overlaying the serving cell i also referred to as a macro cell, or underlying the serving cell i also referred to as a micro cell. The interfered cell j may be served by the radio base station 12 or a different radio base station such as a neighbouring radio base station 13.

The first and second pathlosses may be obtained by receiving indications from the user equipment 12 or from internally stored measurements or data.

Step 503.

The radio base station 12 selects a value of one or more parameters, respectively. The value is selected based on the first pathloss and the second pathloss. The one or more parameters are to be used to control a transmission power of the user equipment 10. The one or more parameters may in some embodiments comprise a weighting parameter used to adjust the transmission power of the user equipment 10 to compensate for pathloss, which weighting parameter is a weighting indicator of the pathloss and referred to as α. In some embodiments the one or more parameters may comprise a power parameter indicating a reception power at the radio base station 12 used in determining transmission power of the user equipment 10, also denoted as $P_0$.

In some embodiments, the radio base station 12 compare the first pathloss and the second pathloss with one or more threshold values stored when selecting the value or values of the one or more parameters. This comparison is used to identify that the value of the one or more parameters for the user equipment 10 is to be selected based on the first and second pathloss. Thus, a non-typical user equipment may be identified and consequently adjust α and/or $P_0$ utilized by the identified non-typical user equipment based on the obtained measurements and a general value for α and/or $P_0$ is to be selected for a typical user equipment. The radio base station may select values of the one or more parameters, respectively, based on a ratio of the first pathloss and the second pathloss.

In some embodiments, the radio base station 12 may obtain the second pathloss towards each interfered cell j,k,l,m out of a number of interfered cells j,k,l,m. Thus, the radio base station 12 obtains a number of second pathlosses. The value of the respective one or more parameters is selected based on the first pathloss and a sum of the number of second pathlosses. The radio base station 12 may alternatively select the value of the respective one or more parameters based on the first pathloss and a lowest pathloss out of the number of second pathlosses.

In some embodiments, the radio base station 12 may select the value further based on scheduling of transmissions in the interfered cell j. Thus, the radio base station 12 may compare transmission scheduling in the serving cell i with transmission scheduling in the interfered cell j.

Step 504.

In some alternative embodiments, as indicated by the dashed line, the user equipment 10 is referred to as a first user equipment 10 and a number of user equipments 10,41, 42, including the first user equipment 10, are served by the radio base station 12 in the serving cell i. The radio base station 12 then obtains the first pathloss from respective user equipment 10,41,42 towards the serving cell i. The radio base station 12 also obtains the second pathloss from respective user equipment 10,41,42 towards the interfered cell. The radio base station 12 then selects the value of the one or more parameter, respectively, based on an average of the first pathlosses and an average of the second pathlosses of the number of user equipments 10,41,42. The radio base station 12 uses the value or values in a power control of the number of user equipments 10,41,42 as an initial value.

Step 505.

In some alternative embodiments, as indicated by the dashed line, the radio base station 12 may then fine tune each one of the user equipments 10,41,42 by transmitting a power command based on an updated selected value of the one or more parameters. Thus, the radio base station 12 may use an average value of the parameter/s as an initial start-up value of α and/or $P_0$ in order to reduce the signalling resources to obtain optimal transmission power. For example, the radio base station sends 1 bit TPC whether to increase or decrease transmission power with 1 dB.

Embodiments herein enable a high performance of the radio communications network in terms of coverage and capacity by adjusting α and/or $P_0$ utilized based on the obtained pathloss measurements.

Figure 6:
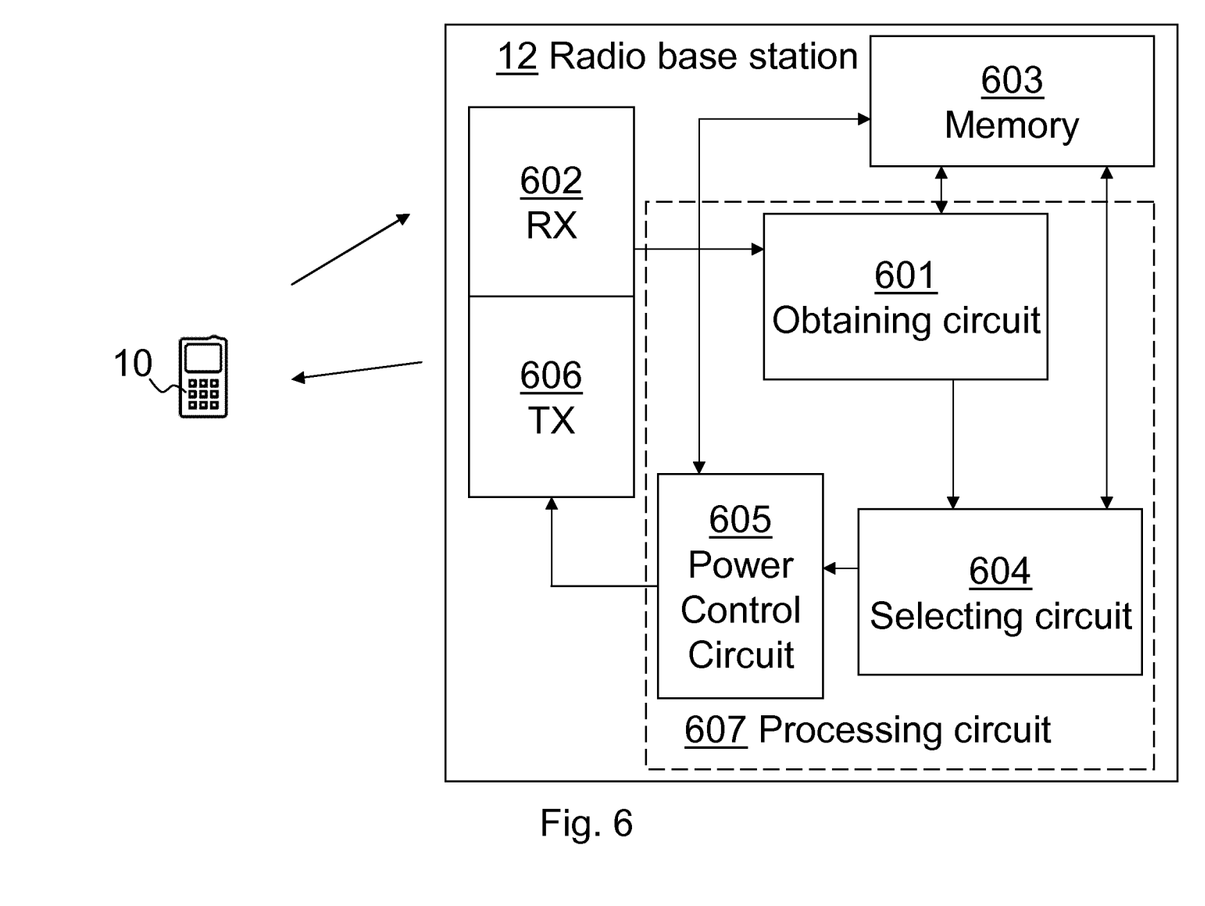
FIG. 6 is a block diagram depicting a radio base station.

In order to perform the method a radio base station 12 is provided. FIG. 6 is a block diagram depicting the radio base station 12. The radio base station 12 is configured to control a serving cell i and a user equipment 10 served in the serving cell i. The radio base station 12 comprises an obtaining circuit 601 configured to obtain a first pathloss from the user equipment 10 towards the serving cell i. The obtaining circuit 601 is further configured to obtain a second pathloss from the user equipment 10 towards the an interfered cell j. The first and second pathlosses may be received as indications over a receiver RX 602 from the user equipment 10 or retrieved from measurements stored internally in a memory 603 at the radio base station 12. The radio base station 12 further comprises a selecting circuit 604 configured to select a value of one or more parameters, respectively. The value is selected based on the first pathloss and the second pathloss. The one or more parameters are to be used to control a transmission power of the user equipment 10.

The one or more parameters may in some embodiments comprise a weighting parameter used to adjust the transmission power of the user equipment 10 to compensate for pathloss. The weighting parameter is a weighting indicator of the pathloss and referred to as α. In some embodiments the one or more parameters may comprise a power parameter indicating a reception power at the radio base station 12 used in determining transmission power of the user equipment 10, also denoted as $P_0$.

In some embodiments, the selecting circuit 604, when selecting the value, is further configured to compare the first pathloss and the second pathloss with one or more threshold values stored at the memory 603. This comparison is used to identify that the value of the one or more parameters for the user equipment 10 is to be selected based on the first and second pathloss. Thus, a non-typical user equipment may be identified and consequently adjust α and/or $P_0$ utilized by the identified non-typical user equipment based on the obtained measurements. In some embodiments, the selecting circuit 604 is configured to select a general value for α and/or $P_0$ for a typical user equipment. The selecting circuit 604 may additionally in some embodiments be configured to select values of the one or more parameters, respectively, based on a ratio of the first pathloss and the second pathloss.

In some embodiments, obtaining circuit 601 may be configured to obtain the second pathloss towards each interfered cell j,k,l,m out of a number of interfered cells j,k,l,m. Thus, obtaining circuit 601 obtains a number of second pathlosses. Then the selecting circuit 604 may be configured to select the value of the respective one or more parameters based on the first pathloss and a sum of the number of second pathlosses. The selecting circuit 604 may alternatively be configured to select the value of the respective one or more parameters based on the first pathloss and a lowest pathloss out of the number of second pathlosses.

In some embodiments, the selecting circuit 604 may be configured to select the value further based on scheduling of transmissions in the interfered cell j. Thus, the selecting circuit 604 may compare transmission scheduling in the serving cell i with transmission scheduling in the interfered cell j. These transmission schedulings may be stored in the memory 603 or received from a neighbouring radio base station.

In some alternative embodiments, as indicated by the dashed line, the user equipment 10 is referred to as a first user equipment 10 and a number of user equipments 10,41, 42, including the first user equipment 10, are served by the radio base station 12 in the serving cell i. The obtaining circuit 601 may then be configured to obtain the first pathloss from respective user equipment 10,41,42 towards the serving cell i. The obtaining circuit 601 may then also be configured to obtain the second pathloss from respective user equipment 10,41,42 towards the interfered cell j. The selecting circuit 604 may then be configured to select the value of the one or more parameter, respectively, based on an average of the first pathlosses and an average of the second pathlosses of the number of user equipments 10,41, 42. The radio base station 12 may comprise a power control circuit 605 configured to use the selected value in a power control of the number of user equipments 10,41,42 as an initial value. This initial value or values may be transmitted over a transmitter TX 606 to the user equipment 10.

In some alternative embodiments, the power control circuit 605 may be configured to fine tune each one of the user equipments 10,41,42 by transmitting a power command over the transmitter TX 606 to respective user equipment 10,41,42. The power command is based on an updated selected value of the one or more parameters. Thus, the power control circuit 605 may use an average value of the parameter/s as an initial start-up value of α and/or $P_0$ and transmit short power commands over transmitter TX 606, in order to reduce the signalling resources to obtain optimal transmission power.

The present mechanism for handling transmission power control of a user equipment 10 may be implemented through one or more processors, such as a processing circuit 607 in the radio base station 12 depicted in FIG. 6, together with computer program code for performing the functions of the present solution. The program code mentioned above may also be provided as a computer program product, for instance in the form of a data carrier carrying computer program code for performing the present mechanism when being loaded into radio base station 12. One such carrier may be in the form of a CD ROM disc. It is however feasible with other data carriers such as a memory stick. The computer program code may furthermore be provided as pure program code on a server and downloaded to the radio base station 12.

Also, the memory 603 may comprise one or more memory circuits and may be used to store data on and applications to execute the method when being run on the radio base station 12.

It should here be mentioned that the radio base station 12 also may be referred to as e.g. a NodeB, an evolved Node B (eNB, eNode B), a base transceiver station, Access Point Base Station, base station router, or any other network unit capable to communicate with a user equipment within a cell served by the radio base station 12, depending e.g. on the radio access technology and terminology used.

Figure 7:
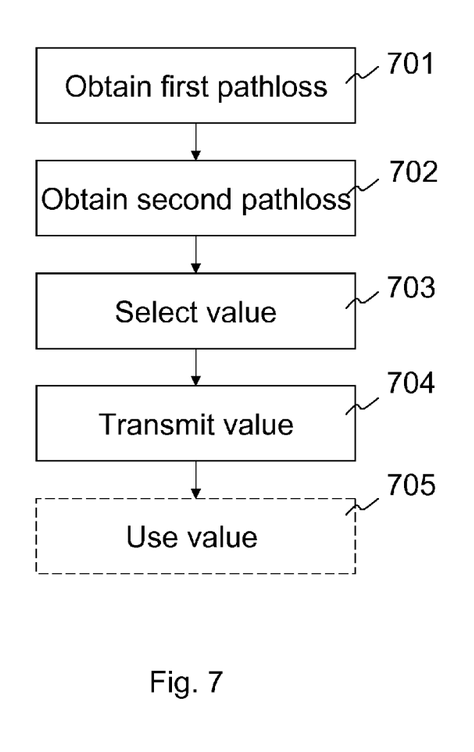
FIG. 7 is a schematic flow chart of a method in a user equipment.

The method step in the user equipment 10 for enabling power control of the user equipment 10 according to some general embodiments will now be described with reference to a flowchart depicted in FIG. 7. The steps do not have to be taken in the order stated below, but may be taken in any suitable order. The user equipment 10 is served by the radio base station 12 in a serving cell i controlled by the radio base station 12. The power control is performed by the radio base station 12.

Step 701.

The user equipment 10 obtains a first pathloss from the user equipment 10 towards the serving cell i.

Step 702.

The user equipment 10 obtains a second pathloss from the user equipment 10 towards an interfered cell j.

It should be understood that the user equipment 10 may base these first and second pathlosses on measurements performed at the user equipment 10.

Step 703.

The user equipment 10 selects a value of one or more parameters, respectively based on the first pathloss and the second pathloss. The one or more parameters are to be used to control transmission power of the user equipment 10. The one or more parameters may comprise a weighting parameter used to adjust the transmission power of the user equipment 10 to compensate for pathloss. The weighting parameter is a weighting indicator of the pathloss also denoted as $\alpha$. The one or more parameters may further or alternatively comprise a power parameter indicating a reception power at the radio base station 12. The power parameter enables the radio base station 12 to determine transmission power of the user equipment 10 and may be denoted as $P_0$.

In some embodiments, the user equipment 10 may, during selection of the value or values, compare the first pathloss and the second pathloss with one or more threshold values to identify that the value of the one or more parameters for the user equipment 10 is to be selected based on the first and second pathlosses. Thus, a user equipment with a special pathloss case as stated above, also referred to as a non-typical user equipment, may be identified to select the value for the non-typical user equipment based on the first and second pathlosses. The selection of the value of the one or more parameters, respectively, may be based on a ratio of the first pathloss and the second pathloss.

In some embodiments, the user equipment 10 obtains the second pathloss towards each interfered cell j,k,l,m out of a number of interfered cells j,k,l,m, resulting in a number of second pathlosses. The value of the one or more parameter and is selected based on the first pathloss and a sum of the number of second pathlosses. Alternatively, the user equipment 12 selects the value based on the first pathloss and a lowest pathloss out of the number of second pathlosses.

Step 704.

The user equipment 10 transmits the value to the radio base station 12 enabling the radio base station 12 to perform the power control of the user equipment 10.

Step 705.

In an additional embodiment, as indicated by the dashed line, the user equipment 10 uses the selected value of the one or more parameters to transmit data with a transmission power.

Consequently, a high performance of the radio communications network in terms of coverage and capacity is achieved by adjusting $\alpha$ and/or $P_0$ utilized based on the obtained pathloss measurements.

Figure 8:
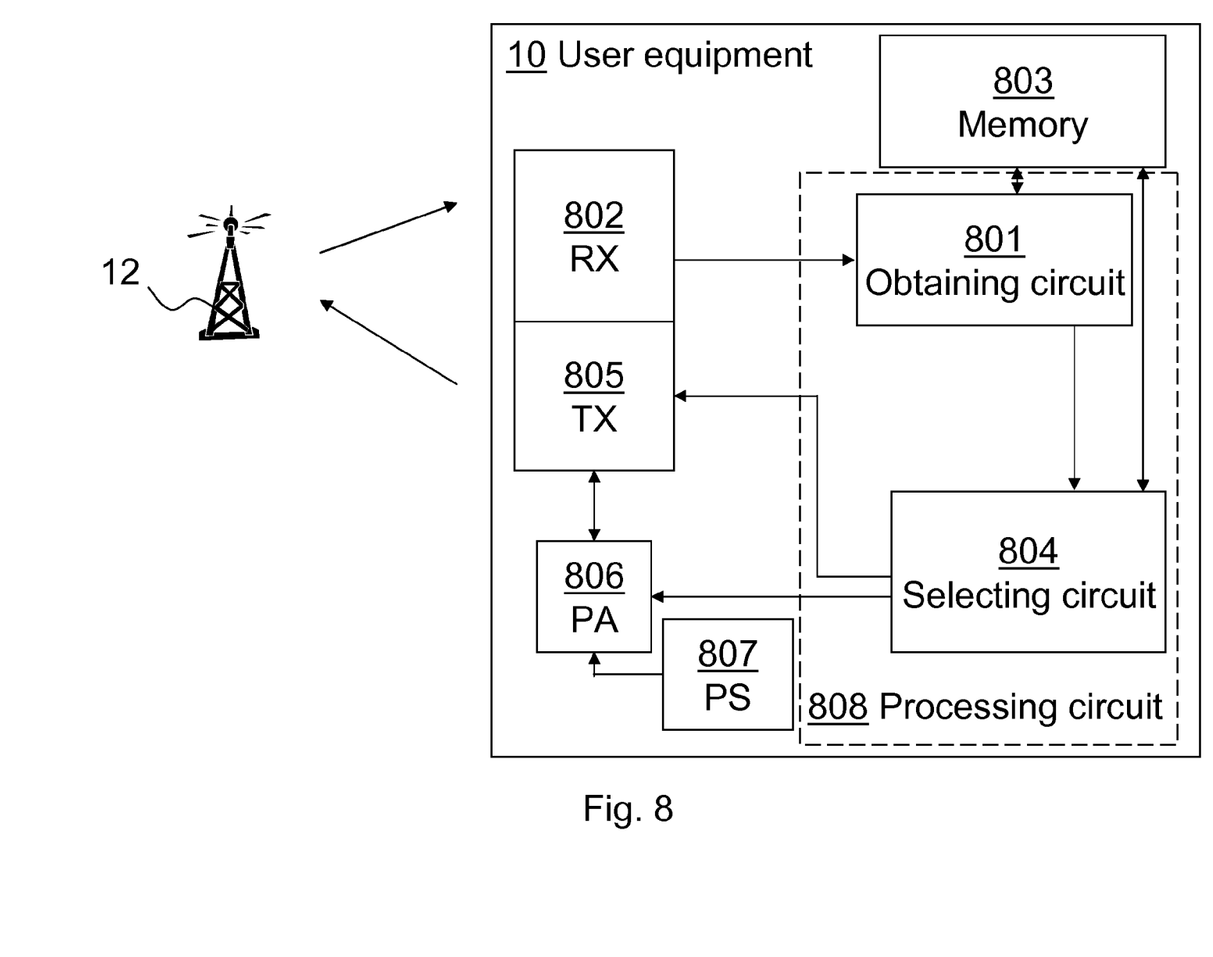
FIG. 8 is a block diagram depicting a user equipment.

In order to perform the method a user equipment 10 is provided. FIG. 8 is a block diagram depicting the user equipment 10. The user equipment 10 is configured to be served by the radio base station 12 in a serving cell i controlled by the radio base station 12. The user equipment 10 comprises an obtaining circuit 801 configured to obtain a first pathloss from the user equipment 10 towards the serving cell i and to obtain a second pathloss from the user equipment 10 towards an interfered cell j. The obtaining circuit 801 may obtain the pathlosses from measurements performed in user equipment 10. These measurements are performed on signals received over a receiver RX 802. The obtaining circuit 801 may also retrieve the pathlosses calculated and stored at a memory 803.

The user equipment 10 also comprises a selecting circuit 804 configured to select a value of one or more parameters, respectively, which one or more parameters are to be used to control a transmission power of the user equipment 10. The value is selected based on the first pathloss and the second pathloss. The one or more parameters may comprise a weighting parameter used to adjust the transmission power of the user equipment 10 to compensate for pathloss. The weighting parameter is a weighting indicator of the pathloss also denoted as $\alpha$. The one or more parameters may further or alternatively comprise a power parameter indicating a reception power at the radio base station 12. The power parameter enables the radio base station 12 to determine transmission power of the user equipment 10 and may be denoted as $P_0$. In some embodiments, the selecting circuit 804 may, during selection of the value or values, compare the first pathloss and the second pathloss with one or more threshold values to identify that the value of the one or more parameters for the user equipment 10 is to be selected based on the first and second pathloss. Thus, user equipment with special pathloss cases as stated above, also referred to as non-typical user equipment, may be identified to select the value for the non-typical user equipment. The selection of the value of the one or more parameters, respectively, may be based on a ratio of the first pathloss and the second pathloss.

In some embodiments, the obtaining circuit 801 is configured to obtain the second pathloss towards each interfered cell j,k,l,m out of a number of interfered cells j,k,l,m, resulting in a number of second pathlosses. The selecting circuit 604 is then configured to select the value of the one or more parameter based on the first pathloss and a sum of the number of second pathlosses. Alternatively, the selecting circuit 604 may be configured to select the value based on the first pathloss and a lowest pathloss out of the number of second pathlosses.

Furthermore, the user equipment 10 comprises a transmitter TX 805 configured to transmit the value or values of for example $\alpha$ and/or $P_0$ to the radio base station 12 thereby enabling the radio base station 12 to perform the power control of the user equipment 10.

The user equipment 10 may then configured to use the selected value of the one or more parameters to transmit data with a transmission power of a power amplifier (PA) 806. The PA 806 may be energy fed by a power source (PS) 807 such as a battery.

The present mechanism for enabling power control of the user equipment 10 performed by a radio base station 12 may be implemented through one or more processors, such as a processing circuit 808 in the user equipment 10 depicted in FIG. 8, together with computer program code for performing the functions of the present solution. The program code mentioned above may also be provided as a computer program product, for instance in the form of a data carrier carrying computer program code for performing the present mechanism when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

Also, the memory 803 comprising one or more memory circuits may be used in the user equipment 10 to store data on and applications to execute the method when being run on the user equipment 10.

The user equipment 10 may e.g. be referred to as a wireless communication terminal, a mobile cellular phone, a Personal Digital Assistant (PDA), a wireless platform, a laptop, a computer or any other kind of device capable to communicate wirelessly with the radio base station 12.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the invention being defined by the following claims.

The invention claimed is:

1. A method in a radio base station for handling transmission power control of a user equipment, which user equipment is served by the radio base station in a serving cell controlled by the radio base station, the method comprising:
    obtaining a first pathloss from the user equipment towards the serving cell;
    obtaining a second pathloss from the user equipment towards an interfered cell; and
    selecting a value of one or more parameters, respectively, wherein the one or more parameters are used to control a transmission power of the user equipment,
    wherein the user equipment is referred to as a first user equipment and wherein a plurality of user equipments including the first user equipment are served by the radio base station in the serving cell, and the radio base station obtains the first pathloss from respective user equipments towards the serving cell, resulting in a plurality of first pathlosses, and the second pathloss from respective user equipments towards the interfered cell, resulting in a plurality of second pathlosses,
    wherein the value of one or more parameters is selected based on an average of the plurality of first pathlosses and an average of the plurality of second pathlosses.

2. The method according to claim 1, wherein the one or more parameters comprise a weighting parameter used to adjust the transmission power of the user equipment to compensate for pathloss, which weighting parameter is a weighting indicator of the pathloss.

3. The method according to claim 1, wherein the one or more parameters comprise a power parameter indicating a reception power at the radio base station used in determining the transmission power of the user equipment.

4. The method according to claim 1, wherein the step of selecting comprises comparing the first pathloss and the second pathloss with the one or more threshold values to identify that the value of the one or more parameters for the user equipment is to be selected based on the first pathloss and the second pathloss.

5. The method according to claim 1, wherein the step of selecting the values of the one or more parameters, respectively, is based on a ratio of the first pathloss and the second pathloss.

6. The method according to claim 1, wherein the radio base station obtains the second pathloss towards each interfered cell out of a number of interfered cells, resulting in a number of second pathlosses, and the value of the respective one or more parameters is selected based on the first pathloss and a lowest pathloss out of the number of second pathlosses.

7. The method according to claim 1, wherein the value is selected further based on scheduling of transmissions in the interfered cell.

8. The method according to claim 1, further comprising fine tuning each one of the user equipments by transmitting a power command based on the selected value of the one or more parameters.

9. A method in a user equipment for enabling power control of the user equipment performed by a radio base station, which user equipment is served by the radio base station in a serving cell controlled by the radio base station, said method comprising:
    obtaining a first pathloss from the user equipment towards the serving cell;
    obtaining a second pathloss from the user equipment towards an interfered cell;
    selecting a value of one or more parameters, respectively, wherein the one or more parameters are used to control transmission power of the user equipment,
    wherein the user equipment is referred to as a first user equipment and wherein a plurality of user equipments including the first user equipment are served by the radio base station in the serving cell, and the user equipment obtains the first pathloss from respective user equipments towards the serving cell, resulting in a plurality of first pathlosses, and the second pathloss from respective user equipments towards the interfered cell, resulting in a plurality of second pathlosses,
    wherein the value of one or more parameters is selected based on an average of the plurality of first pathlosses and an average of the plurality of second pathlosses; and
    transmitting the value to the radio base station, thereby enabling the radio base station to perform the power control of the user equipment.

10. The method according to claim 9, wherein the one or more parameters comprise a weighting parameter used to adjust the transmission power of the user equipment to compensate for pathloss, which weighting parameter is a weighting indicator of the pathloss.

11. The method according to claim 9, wherein the one or more parameters comprise a power parameter indicating a reception power at the radio base station, which power parameter enables the radio base station to determine the transmission power of the user equipment.

12. The method according to claim 9, wherein the step of selecting comprises comparing the first pathloss and the second pathloss with the one or more threshold values to identify that the value of the one or more parameters for the user equipment is to be selected based on the first pathloss and the second pathloss.

13. The method according to claim 9, wherein the step of selecting the values of the one or more parameters, respectively, is based on a ratio of the first pathloss and the second pathloss.

14. The method according to claim 9, wherein the user equipment obtains the second pathloss towards each interfered cell out of a number of interfered cells, resulting in a number of second pathlosses, and the value of the respective one or more parameters is selected based on the first pathloss and a lowest pathloss out of the number of second pathlosses.

15. A radio base station for handling transmission power control of a user equipment, which user equipment is configured to be served by the radio base station in a serving cell controlled by the radio base station, wherein radio base station comprises a processing circuitry configured to:
  obtain a first pathloss from the user equipment towards the serving cell and obtain a second pathloss from the user equipment towards an interfered cell; and
  select a value of one or more parameters, respectively, wherein the one or more parameters are used to control a transmission power of the user equipment,
  wherein the user equipment is referred to as a first user equipment and wherein a plurality of user equipments including the first user equipment are served by the radio base station in the serving cell, and the radio base station obtains the first pathloss from respective user equipments towards the serving cell, resulting in a plurality of first pathlosses, and the second pathloss from respective user equipments towards the interfered cell, resulting in a plurality of second pathlosses,
  wherein the value of one or more parameters is selected based on an average of the plurality of first pathlosses and an average of the plurality of second pathlosses.

16. A user equipment for enabling power control of the user equipment performed by a radio base station, which user equipment is configured to be served by the radio base station in a serving cell controlled by the radio base station, the user equipment comprises a processing circuitry configured to:
  obtain a first pathloss from the user equipment towards the serving cell and obtain a second pathloss from the user equipment towards an interfered cell;
  select a value of one or more parameters, respectively, wherein the one or more parameters are used to control a transmission power of the user equipment,
  wherein the user equipment is referred to as a first user equipment and wherein a plurality of user equipments including the first user equipment are served by the radio base station in the serving cell, and the user equipment obtains the first pathloss from respective user equipments towards the serving cell, resulting in a plurality of first pathlosses, and the second pathloss from respective user equipments towards the interfered cell, resulting in a plurality of second pathlosses,
  wherein the value of one or more parameters is selected based on an average of the plurality of first pathlosses and an average of the plurality of second pathlosses; and
  transmit the value to the radio base station, thereby enabling the radio base station to perform the power control of the user equipment.

* * * * *